(12) United States Patent
Grover

(10) Patent No.: US 8,214,844 B2
(45) Date of Patent: Jul. 3, 2012

(54) SYSTEMS AND METHODS FOR ADJUSTING SERVICE QUEUE CAPACITY

(75) Inventor: Rajiv K. Grover, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1655 days.

(21) Appl. No.: 11/118,895

(22) Filed: Apr. 29, 2005

(65) Prior Publication Data

US 2006/0248535 A1 Nov. 2, 2006

(51) Int. Cl.
*G06F 9/46* (2006.01)
(52) U.S. Cl. ........................................ 718/107
(58) Field of Classification Search .................... 718/103
See application file for complete search history.

(56) References Cited

U.S. PATENT DOCUMENTS

| | | | |
|---|---|---|---|
| 6,021,425 A * | 2/2000 | Waldron et al. | 718/103 |
| 6,128,657 A * | 10/2000 | Okanoya et al. | 709/224 |
| 6,260,058 B1 * | 7/2001 | Hoenninger et al. | 718/107 |
| 6,272,606 B1 * | 8/2001 | Dorricott et al. | 711/158 |
| 6,327,613 B1 * | 12/2001 | Goshey et al. | 709/208 |
| 6,411,982 B2 * | 6/2002 | Williams | 718/102 |
| 6,516,346 B1 * | 2/2003 | Asco et al. | 709/221 |
| 6,785,889 B1 * | 8/2004 | Williams | 718/104 |
| 7,219,145 B2 * | 5/2007 | Chmaytelli et al. | 709/224 |
| 2005/0128508 A1 * | 6/2005 | Greeff et al. | 358/1.15 |

OTHER PUBLICATIONS

Banachowski, Scott A., et al, "Better Real-Time Response for Timeshare Scheduling", Proceedings of Parallel and Distributed Processing Symposium, Apr. 22-26, 2003.*

* cited by examiner

*Primary Examiner* — Emerson Puente
*Assistant Examiner* — Gregory Kessler

(57) ABSTRACT

Systems and methods for adjusting the number of tasks that are accepted for processing in a computer based on processing resources required by the tasks, processing resources available in the computer system, and the time allowed to complete at least one of the tasks. The tasks that are accepted for processing can be scheduled to timeshare the processing resources available so that the task(s) complete within the time allowed.

23 Claims, 3 Drawing Sheets

SYSTEMS AND METHODS FOR ADJUSTING SERVICE QUEUE CAPACITY

BACKGROUND

Data processing systems typically include various hardware elements that have microcode (also referred to as "firmware") associated therewith. One example of such an element is a storage adapter that provides the capability to attach a data storage subsystem such as a Redundant Array of Independent Disks (RAID) array to a data processing system. In addition to various hardware components including a computer processor and memory, the adapter is provided with microcode in memory to control the operation of the adapter to transfer data between the data processing system and storage subsystem.

In many modern systems of this type, the microcode is stored in programmable memory and it is thus possible to upgrade the microcode from the level that was originally provided with the system. This allows problems in the code to be fixed, and also allows extra functionality to be added to the system, without changing the hardware.

Various other types of operations can also require a large amount of data to be transferred in a relatively short time period.

BRIEF DESCRIPTION OF THE FIGURES

Embodiments disclosed herein may be better understood by referencing the accompanying drawings. The use of the same reference symbols in different drawings indicates similar or identical items.

DETAILED DESCRIPTION

Embodiments and techniques disclosed herein can be used to minimize impact to users when performing operations that require a large amount of data to be transferred in a relatively short time period, such as upgrading microcode in a data storage subsystem. When such transfers are to be performed, the device receiving the large transfer request can notify other requesters to reduce their usage of the receiving device until the transfer is completed. As a result, operating system and application program failures due to timeouts and buffer overflow are minimized.

Figure 1:
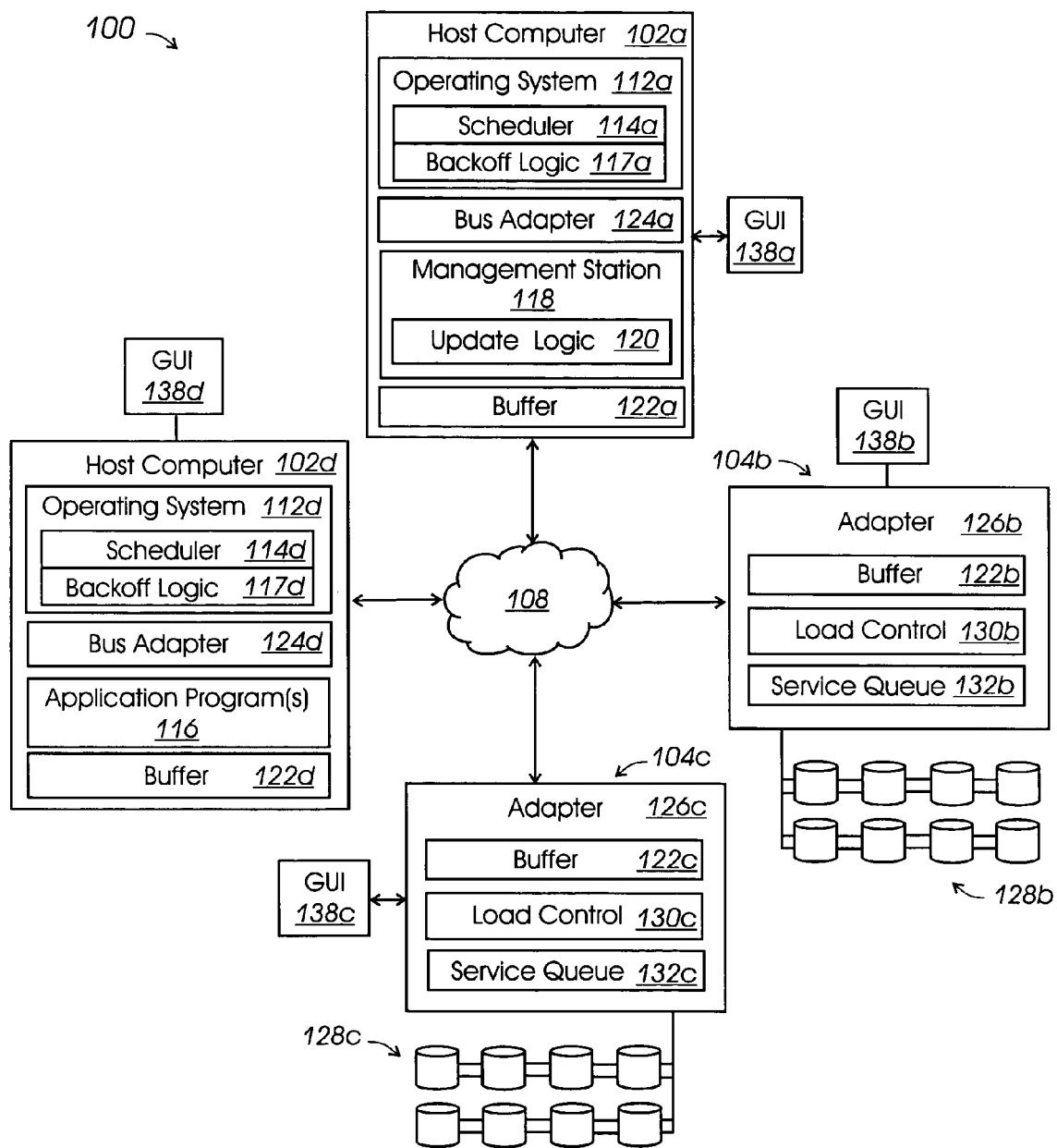
FIG. 1 is a schematic block diagram of an embodiment of a network configured with load control logic to adjust the load of service queues in target data processing systems.

As an example of a system in which a receiving device with the ability to control data flow can be used, FIG. 1 depicts an embodiment of wide-area distributed storage area network (DSAN) 100 that can include one or more host computers 102 configured to transfer data to and from local and remote target systems, such as disk storage systems 104b, 104c, for example. Components in local networks and wide area networks (WANs) 108 in DSAN 100, such as switches and routers, can comply with one or more suitable communication protocols to allow host computers 102 and storage systems 104 to communicate over a wide range of distances, for example, from less than 1 meter to 100 kilometers (km) or more.

Note that, to simplify notation, similar components and systems designated with reference numbers suffixed by the letters "a", "b", "c", or "d" are referred to collectively herein by the reference number alone. Although such components and systems may perform similar functions, they can differ in some respects from other components with the same reference number. For example, storage systems 104b, 104c may be collectively referred to as storage systems 104, however, storage systems 104b, 104c may or may not include the same number or type of components, or use the same communication protocol(s).

Host computers 102 are shown with respective operating systems 112 that include scheduler 114 to allow two or more components or processes to share resources, such as application programs 116 sharing resources in host computer 102d. Application programs 116 can be implemented in any suitable programming language, and more than one instance of an application program 116 can run in host computer 102d. In some embodiments, application programs 116 are implemented as one or more units of executable instructions, also referred to as processes. Scheduler 114 allocates processor time to each process. When more than one process is ready to run, scheduler 114 can typically switch from one process to another, so that the processes appear to run simultaneously.

Scheduler 114 can maintain a ready list of processes that are ready to run and a wait list of processes that are waiting for an event to occur before they are ready to execute. Various types of handlers can be included in operating system 112 to receive signals from specified components within and/or external to DSAN 100. The handlers can translate the signals to an event that can be detected by other components in DSAN 100. When an event issues or is detected, one or more processes on the wait list pending the event transition to the READY state and are placed on the ready list. Scheduler 114 resumes and selects the process with the highest priority in the READY state to run.

Scheduler 114 can include or interface with backoff logic 117 to curtail input/output (I/O) requests to a target storage system 104 when target storage system 104 issues a response to host 102 indicating that target storage system 104 is unable to accept subsequent requests. Backoff logic 117 can re-attempt to issue the request after one or more wait periods until target storage system 104 indicates that subsequent requests will be accepted.

Host computer 102a includes management station 118 that allows an operator to monitor and control various devices in DSAN 100. Management station 118 can also be configured with update logic 120 to allow an operator to upgrade/update microcode in any suitable components of DSAN 100.

Buffer(s) 122 can be included in DSAN 100 to store input and/or output data pending transfer. Host computers 102 and storage systems 104 can include respective adapters 124, 126 that interface with network 108 to transfer data using various communication protocols. Adapters 126 are typically coupled to access one or more storage elements 128, such as Small Computer Systems Interface (SCSI) storage devices, Redundant Array of Independent Disks (RAID), Integrated Drive Electronics (IDE) disk drives, and/or other suitable devices.

Components in DSAN 100 can comply with one or more suitable communication technologies such as, for example, direct connection using optical fiber or other suitable communication link, dense wave division multiplexers (DWDM), Internet protocol (IP), small computer systems interface (SCSI), internet SCSI (iSCSI), fibre channel (FC), fibre channel over Internet protocol (FC-IP), synchronous optical network (SONET), asynchronous transfer mode (ATM), Enterprise System Connection (ESCON), and/or proprietary protocols such as IBM's FICON® protocol. Suitable technology such as FC fabrics (i.e., a group of two or more FC switches) and arbitrated loops may be used to allow access among multiple hosts 102 and storage systems 104. Data is transferred between host computers 102 and storage systems 104 using messages that are formatted according to the protocol(s) being used by components in host computers 102 and target storage systems 104.

Note that, in general, network 108 can manage multiple streams and channels of data in multiple directions over multiple ports and multiple interfaces. To simplify the description, this multiplicity of channels, ports, and interfaces is not discussed herein. However, embodiments disclosed herein may be extended to include multiple channels, ports, and interfaces.

Additionally, some protocols refer to messages between components as signals, whereas other protocols may refer to such messages as constructs. Still other protocols may refer to messages by other terms. Therefore, "signals" is used herein to refer to messages sent between components in system 100 to simplify terminology.

Adapters 124, 126 may be implemented in any suitable electronic system, device, or component such as, for example, a host bus adapter, a storage controller, a disk controller, a network management appliance, or other suitable device. Adapters 124, 126 may include one or more embedded computer processors that are capable of transferring information at a high rate to support multiple storage elements 128 in a scaleable storage array. Adapters 124, 126 may be connected to embedded processors and operate as a hub device to transfer data point-to-point or, in some embodiments, on a network fabric among multiple storage levels.

Adapters 126 can include load control logic 130 that determines whether incoming requests from host computers 102 and other storage systems 104 can be accommodated, as available per protocol or system architecture. For example, adapters 126 typically include service queues 132 with a number of slots available for handling requests. When all of the available slots are occupied, load control logic 130 can respond to the initiator of the request with a message indicating that service queue 132 is full. Additionally, adapters 126 can include scheduler logic that performs functions similar to scheduler 114 in host computers 102. The scheduler logic in adapter 126 can be implemented in load control logic 130, in a separate module, or in any other suitable component.

Figure 2:
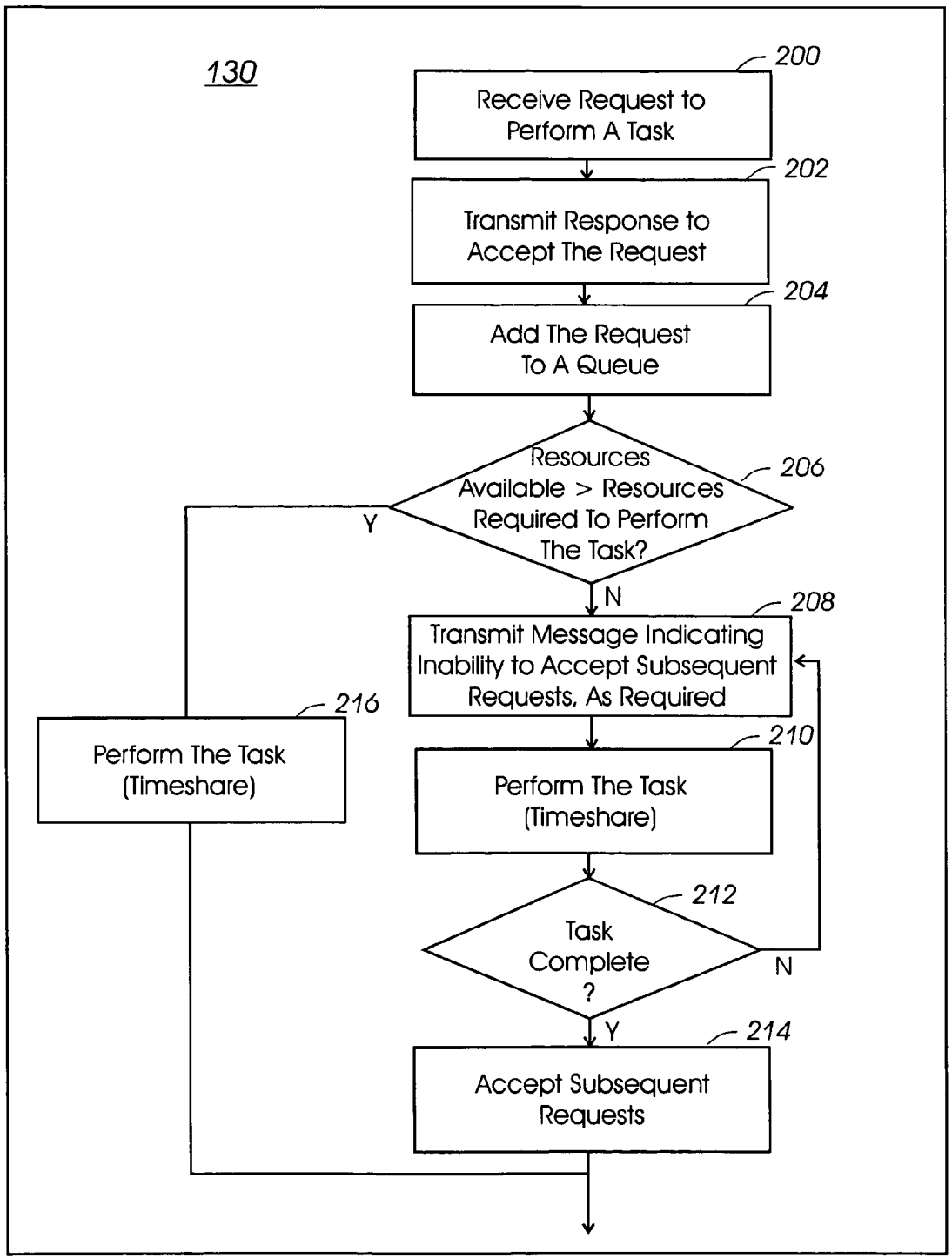
FIG. 2 is a flow diagram of an embodiment of a method for adjusting host and service queue load.

Referring now to FIGS. 1 and 2, FIG. 2 shows a flow diagram of an embodiment of a portion of load control logic 130 that can be used in adapters 126 to accommodate processing tasks that require more time than usual and/or when it is desirable for the process to complete in an expedited manner. For example, when update logic 120 issues a request to upgrade microcode in one or more of storage elements 128, it is typically desirable to complete the task as quickly as possible so the storage element(s) 128 can be returned to service. It is also desirable to avoid causing other tasks that request use of the storage elements 128 to time out or enter an error condition while waiting for the update task to complete.

In the embodiment shown, process 200 includes receiving a request to perform a task, such as reading data from or writing data to storage elements 128, or upgrading the microcode in one or more of storage elements 128. The request can be initiated by host computers 102, other storage systems 104, or other suitable component within or external to DSAN 100.

One or more transfer mode parameters can be provided with the request to indicate the amount and/or type of data to be transferred. Process 206 can use the transfer mode parameter(s) to determine whether the time required to complete the task within a specified time is greater than the time available, considering that the resources to be used will be timeshared with other tasks currently in service queue 132. One or more suitable components in DSAN 100 can be configured to generate the transfer mode parameter(s). The transfer mode parameters can be communicated from host computer 102 and storage systems 104 via a separate transfer mode message that is part of a communication protocol, in a field of another message that is part of a communication protocol, or other suitable manner. For example, the transfer mode parameters can be transmitted via one of the open fields that are available for vendor-specified use in the command descriptor block of the SCSI protocol.

The transfer mode parameter(s) can be set automatically by components in DSAN 100, and/or under external control. In some embodiments, a graphical user interface (GUI) 138 may be implemented at host computers 102 and/or storage systems 104 to enable setting or selection of the transfer mode parameter(s). For example, when an operator wants to update one or more storage elements 128, he or she can set transfer mode parameters via GUI 138*a* to indicate the amount of data, type of data, a time limit for transferring the data, and/or other relevant information. The operator can set the transfer mode parameter(s) to default values that may, or may not, be overridden by components in DSAN 100, and vice versa. Further, the transfer mode parameter(s) can be initialized/set using other suitable methods such as inputting values from a stored file, or other suitable method. Alternatively, instead of using transfer mode parameters, the data transfer capability/behavior may be hard coded in adapter 126, and host computers 102 may send data at the hard-coded load levels.

The receiving adapter 126 issues a response to the initiator of the request indicating whether the request can be accommodated in service queue 132, as indicated in process 202. Assuming the request is accepted, process 204 adds one or more tasks associated with the request to service queue 132 in adapter 126.

In process 206, a value is determined that represents the amount of time the most recent task added to the queue will require to be performed in an optimal manner. Process 206 can also determine whether the time/processing resources available are sufficient to complete the requested task within a predetermined or optimal time, considering that the resources to be used will be timeshared with other tasks currently in service queue 132. Alternatively, the current tasks in service queue 132 can be serviced until resources are available to handle the request.

Process 208 can start limiting the number of subsequent tasks that are added to service queue 132. In some embodiments, the number of tasks added to service queue 132 while the large task is being performed can be controlled by issuing a signal via a standard protocol indicating inability to accept subsequent requests. For example, depending on the operating system, a TASK SET FULL, QUEUE FULL, BUSY, or CHECK CONDITION signal can be sent from the target storage system 104 to the initiating host 102 when using the Small Computer Systems Interface (SCSI) communication protocol or Fibre Channel protocol. Other suitable signals can be used in other standard protocols/interfaces.

In some embodiments, as the other tasks in service queue 132 complete, more resources will be available to complete the large task within the specified time limit since no additional tasks will be added to service queue 132 until the large task completes. In other embodiments, a controlled number of tasks can be added to service queue 132 while the large, time-critical task is running, based on the processing resources available and the processing resources required by the task(s) in service queue 132. The tasks allowed to enter service queue 132 can be limited by transmitting a message to the requesting component indicating that, temporarily, the request cannot be performed. Scheduler 114 in the component receiving the message can place the process in the wait queue and suspend the request until a later time, thus helping to avoid timeouts and buffer overflows in the initiating system, and/or exhaustion of I/O re-attempts, which can lead to data corruption or termination of the requesting application program 116.

Process 210 allows the task to be performed. The task can be scheduled to timeshare resources with other tasks in service queue 132. In some embodiments, processing resources are time shared between tasks in service queue 132, with the task typically receiving a sufficient share of the processing resources to complete within the predetermined/optimal time. Processes 208 and 210 can coordinate their efforts so that the other tasks are not delayed more than a prespecified amount of time. The overhead associated with context switching between tasks, and other relevant factors, can also be taken into account to determine the amount of time each task is allowed to run before being swapped out.

When process 212 determines that the task is complete, process 214 allows tasks associated with subsequent requests to be added to service queue 132. In some embodiments, process 208 can keep track of components whose requests are not accepted, and process 214 can notify those components with suspended requests when service queue 132 becomes available, if such capability is supported by the protocol or architecture. Alternatively, the components with suspended requests can continue issuing the requests according to the behavior of backoff logic 117 of operating system 112 until the requests are accepted.

In some embodiments, process 208 can periodically determine whether more time is available than required to complete the task within the predetermined/optimal time. If so, then additional requests can be accepted until service queue 132 reaches a level beyond which the task would not complete within the predetermined/optimal time.

Note that if the time required to complete the task(s) is less than the time available, the task is performed on a timeshare basis with other tasks in service queue 132, as indicated by process 216.

Figure 3:
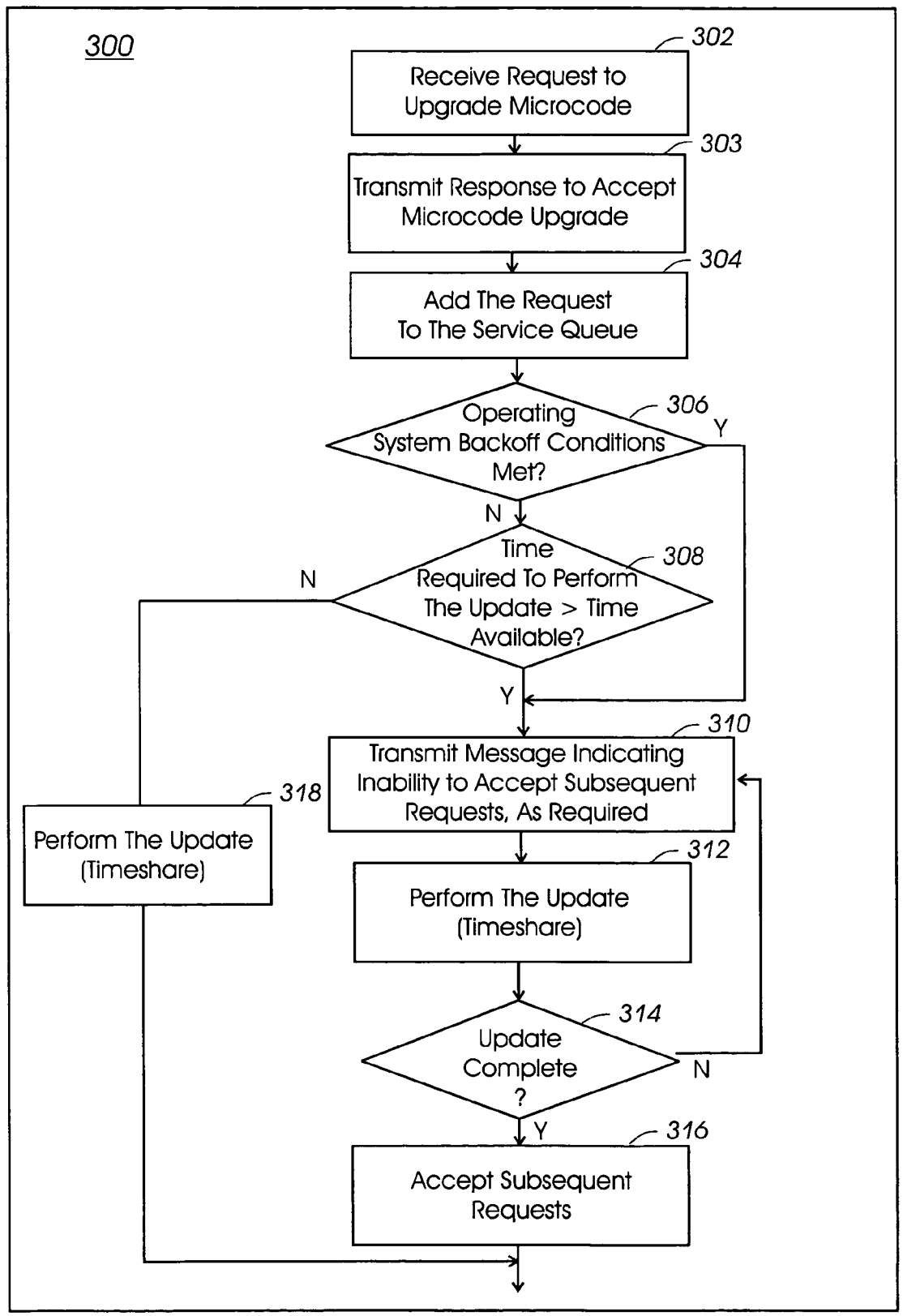
FIG. 3 is a flow diagram of an embodiment of a method for updating microcode in a target system that includes adjusting host queue depth and service queue load.

Referring now to FIGS. 1 and 3, FIG. 3 shows a flow diagram of an embodiment of a method 300 for updating microcode in a target system that includes adjusting host I/O activity and target system service queue capacity. In the embodiment shown, process 302 includes receiving a request to upgrade the microcode in one or more of storage elements 128. The request can be initiated by host computers 102, other storage systems 104, or other suitable component within or external to DSAN 100.

The receiving adapter 126 issues a response to the initiator of the request indicating whether the request can be accommodated in service queue 132, as indicated in process 303. Assuming the request is accepted, process 304 adds one or more tasks associated with the request to service queue 132 in adapter 126.

Process 306 determines whether backoff logic 117 in operating system 112 needs to be instigated if target adapter 126 is unable to accept subsequent requests. In hard-coded embodiments, the target service queue 132 may be reduced or other such mechanisms be used to allow resources to be focused on microcode upgrade activity to instigate host backoff logic 117 sooner. If not, process 308 determines a value that represents the amount of time required to complete the microcode upgrade within the allowed time. Thus, it is typically desirable to perform the upgrade as quickly as possible to reduce the amount of time the components are unavailable. Additionally, some components of adapter 126 may need to be reset, which can impact I/O requests from host computer 102 if the requests are not curtailed. The amount of time for performing the upgrade can be determined in various ways by one or more components in DSAN 100. For example, update logic 120 can communicate a predetermined optimal time along with the request to the appropriate adapter 126. Alternatively, load control logic 130 can determine the optimal time based on the amount of data and the speed of the downloading capability, as well as other relevant factors.

Process 308 can also determine whether the time/processing resources available are sufficient to complete the requested microcode upgrade within a predetermined or optimal time, considering that the resources to be used will be timeshared with other tasks currently in service queue 132. Alternatively, the current tasks in service queue 132 can be serviced until resources are available to handle the code upgrade request. If the conditions for backoff logic 117 to curtail I/O requests are met in process 306, or process 308 determines that the time required to perform the update is greater than the time available, process 310 can start limiting the number of subsequent tasks that are added to service queue 132 by issuing signal that indicates inability to accept subsequent requests to requesting host computers 102. For example, a TASK SET FULL, QUEUE FULL, BUSY, or CHECK CONDITION signal from the target storage system 104 to the initiating host 102 when using the Small Computer Systems Interface (SCSI) communication protocol or Fibre Channel protocol. Other suitable signals can be used in other standard protocols/interfaces.

Process 312 allows the microcode to be updated. The upgrade task can be scheduled to timeshare resources with other tasks in service queue 132. In some embodiments, processing resources are time shared between tasks in service queue 132, with the upgrade task typically receiving a sufficient share of the processing resources to complete within the predetermined/optimal time. Process 310 and 312 can coordinate their efforts so that the other tasks are not delayed more than a prespecified amount of time. The overhead associated with context switching between tasks, and other relevant factors, can also be taken into account to determine the amount of time each task is allowed to run before being swapped out. Process 312 can also revise the predetermined/optimal time upward or downward during the download, as required, based on the demand for the components being upgraded. For example, the predetermined/optimal time to complete the download can be increased for components that are seldom used, and decreased for components that are in high demand.

When process 314 determines that the task is complete, process 316 allows tasks associated with subsequent requests to be added to service queue 132. In some embodiments, process 310 can keep track of components whose requests are not accepted, and process 316 can notify those components, with suspended requests, when service queue 132 becomes available, if such capability is supported by the protocol or architecture. Alternatively, the components with suspended requests can continue issuing the requests according to the behavior of backoff logic 117 of operating system 112 until the requests are accepted.

In some embodiments, process 308 can periodically determine whether more time is available than required to complete the upgrade task within the predetermined/optimal time. If so, then additional requests can be accepted until service queue 132 reaches a level beyond which the upgrade task would not complete within the predetermined/optimal time.

Note that if the time required to complete the upgrade is less than the time available, the task is performed on a timeshare basis with other tasks in service queue 132, as indicated by process 318.

Although an example of upgrading microcode in adapters 126 has been discussed herein, it is recognized that the techniques discussed for load control logic 130 can be implemented in other types of processing components to perform other types of tasks that require a relatively large amount of time to complete, and/or when it is desirable to complete the task within a specified time frame.

Note that using signals that are already available in standard interfaces and protocols for the purpose of adjusting the number of tasks in service queue 132 alleviates the need for vendors of host computers 102 to comply with protocol features that are specific to particular storage systems 104. This alleviates the need for administrators to customize the interface each particular storage system or disrupt production environments to perform special activities such as download. Thus host computers 102 that comply with standard interfaces and protocols will already be equipped to take advantage of the ability to perform relatively lengthy tasks within a desired time frame without completely precluding execution of other tasks.

The logic modules, processing systems, and circuitry described herein may be implemented using any suitable combination of hardware, software, and/or firmware logic instructions, such as general purpose computer systems, workstations, servers, Field Programmable Gate Arrays (FPGAs), Application Specific Integrated Circuits (ASICs), magnetic storage media, optical storage media, and other suitable computer-related devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. Although the illustrative system discloses magnetic disk storage elements, the techniques described herein can be implemented in any type of system or network in which data transfers are made.

In the claims, unless otherwise indicated the article "*a*" is to refer to "one or more than one".

I claim:

1. A computer product comprising:
    logic instructions implemented on non-transitory computer storage media executable to cause a computer processor to:
    receive a request to perform a particular task, wherein the particular task is to be performed within a predetermined time;
    transmit a response to accept the request;
    timeshare processing resources to complete the particular task along with other tasks in a service queue based on completing the particular task within the predetermined time, wherein the service queue has a specified number of slots for executing tasks on a timeshare basis, wherein timesharing the processing resources involves context switching the processing resources among the particular task and the other tasks so that the particular task and the other tasks appear to run simultaneously;
    to allow the particular task to run, issue a message indicating inability to accept subsequent requests into the service queue when the subsequent requests are received whether or not all of the slots in the service queue are fully occupied; and
    resume regular utilization of the service queue when the particular task is complete.

2. The computer product of claim 1 wherein the predetermined time is received with the request.

3. The computer product of claim 1 further comprising:
    logic instructions executable to:
    determine the predetermined time based on the type of the particular task and processing resources available to complete the particular task.

4. The computer product of claim 1 further comprising:
    logic instructions executable to:
    determine the predetermined time based on an amount of data to be downloaded and a speed of the downloading.

5. The computer product of claim 1 further comprising:
    logic instructions executable to:
    determine whether processing resources available are sufficient to complete the particular task within the predetermined time, considering that the processing resources will be timeshared with the other tasks in the service queue.

6. The computer product of claim 1 further comprising:
    logic instructions executable to:
    limit the number of subsequent tasks that are added to the service queue even though a slot in the service queue is unoccupied.

7. The computer product of claim 1 further comprising:
    logic instructions executable to:
    limit the number of subsequent tasks that are added to the service queue by issuing a protocol signal indicating that the service queue is busy, wherein the limiting is performed even though a slot in the service queue is unoccupied.

8. The computer product of claim 1 further comprising:
    logic instructions executable to:
    determine whether additional tasks can be added to the service queue while the particular task is being performed based on the processing resources available, and the processing resources required by the task(s) in the service queue.

9. The computer product of claim 1 further comprising:
    logic instructions executable to:
    timeshare the processing resources based on completing the particular task within the predetermined time and avoiding delay in processing the other tasks more than a prespecified amount of time.

10. The computer product of claim 1 further comprising:
    logic instructions executable to:
    revise the predetermined time upward or downward based on demand for components affected by the particular task.

11. The computer product of claim 1 further comprising:
logic instructions executable to:
keep track of components that issued requests that were not accepted; and
notify the components when the service queue becomes available.

12. The computer product of claim 1 further comprising:
logic instructions executable to:
periodically determine whether at least some of the subsequent requests can be accepted while still allowing the particular task to be completed within the predetermined time.

13. The computer product of claim 1 wherein: the particular task includes upgrading microcode in a storage subsystem.

14. The computer product of claim 1, further comprising logic instructions executable to:
take into account overhead associated with context switching between the particular task and the other tasks to determine the amount of time each task is allowed to run before being swapped out.

15. The computer product of claim 1, wherein issuing the message indicating inability to accept the subsequent requests prevents the subsequent requests from being added to the service queue even as more of the processing resources become available due to one or more of the other tasks completing.

16. The computer product of claim 15, wherein resuming regular utilization of the service queue comprises allowing one or more of the subsequent requests to enter the service queue.

17. A method comprising:
adjusting a number of tasks that are accepted into a service queue for processing in a computer system based on processing resources required by the tasks, processing resources available in the computer system, and a time allowed to complete at least a particular one of the tasks;
scheduling tasks into the service queue that are accepted for processing to timeshare the processing resources available so that the at least one particular task completes within the time allowed, wherein timesharing the processing resources involves context switching the processing resources among the scheduled tasks including the at least one particular task so that the scheduled tasks appear to run simultaneously; and
issuing a message to decline requests for processing subsequent tasks after the at least one particular task until the at least one particular task completes to prevent the requests for processing the subsequent tasks from being added to the service queue even though an entry is available in the service queue.

18. The method of claim 17, further comprising:
scheduling the tasks that are accepted for processing to avoid delay in processing the tasks more than a prespecified amount of time.

19. The method of claim 17, further comprising:
revising the time allowed to complete the at least one particular task based on demand for components affected by the at least one particular task.

20. The method of claim 17, further comprising:
taking into account overhead associated with context switching between the at least one particular task and others of the scheduled tasks to determine the amount of time each scheduled task is allowed to run before being swapped out.

21. An apparatus comprising:
a service queue having slots for handling tasks to be executed;
a computer processor configured to:
receive a request to perform a particular task, wherein the particular task is to be performed within a predetermined time;
transmit a response to accept the request;
timeshare processing resources to complete the particular task along with other tasks in the service queue based on completing the particular task within the predetermined time, wherein the service queue has a specified number of slots for executing tasks on a timeshare basis, wherein timesharing the processing resources involves context switching the processing resources among the particular task and the other tasks so that the particular task and the other tasks appear to run simultaneously;
to allow the particular task to run, issue a message indicating inability to accept subsequent requests into the service queue when the subsequent requests are received whether or not all of the slots in the service queue are fully occupied; and
resume regular utilization of the service queue when the particular task is complete.

22. The apparatus of claim 21, wherein issuance of the message indicating inability to accept the subsequent requests prevents the subsequent requests from being added to the service queue even as more of the processing resources become available due to one or more of the other tasks completing.

23. The apparatus of claim 22, wherein regular utilization of the service queue comprises allowing one or more of the subsequent requests to enter the service queue.

* * * * *